US011940890B2

(12) United States Patent
Xiao

(10) Patent No.: US 11,940,890 B2
(45) Date of Patent: Mar. 26, 2024

(54) TIMING INDEX ANOMALY DETECTION METHOD, DEVICE AND APPARATUS

(71) Applicant: HANGZHOU TUYA INFORMATION TECHNOLOGY CO., LTD., Zhejiang (CN)

(72) Inventor: Zheng Xiao, Zhejiang (CN)

(73) Assignee: HANGZHOU TUYA INFORMATION TECHNOLOGY CO., LTD., Zhejiang (CN)

( * ) Notice: Subject to any disclaimer, the term of this patent is extended or adjusted under 35 U.S.C. 154(b) by 115 days.

(21) Appl. No.: 17/536,140

(22) Filed: Nov. 29, 2021

(65) Prior Publication Data

US 2022/0222159 A1 Jul. 14, 2022

(30) Foreign Application Priority Data

Jan. 11, 2021 (CN) ......................... 202110029227.9

(51) Int. Cl.
*G06F 11/30* (2006.01)
*G06F 11/07* (2006.01)
*G06F 11/32* (2006.01)

(52) U.S. Cl.
CPC ........ *G06F 11/302* (2013.01); *G06F 11/0763* (2013.01); *G06F 11/3079* (2013.01); *G06F 11/327* (2013.01)

(58) Field of Classification Search
CPC . G06F 11/0763; G06F 11/3079; G06F 11/327
See application file for complete search history.

(56) References Cited

U.S. PATENT DOCUMENTS 5,867,659 A * 2/1999 Otteson ............... G06F 11/3466 709/224
8,478,800 B1 * 7/2013 Johnson ................ G06F 16/904 707/827

(Continued)

FOREIGN PATENT DOCUMENTS

CN 108664603 A 10/2018
CN 110008079 A 7/2019

OTHER PUBLICATIONS

Stateless vs Stateful by StackOverflow published last answered 2018 https://stackoverflow.com/questions/5329618/stateless-vs-stateful (Year: 2018).*

*Primary Examiner* — Joseph O Schell
(74) *Attorney, Agent, or Firm* — Samson G. Yu

(57) ABSTRACT

The present disclosure discloses a timing index anomaly detection method, device and apparatus. The method includes the following operations. A plurality of pieces of timing index information about a service to be detected is acquired. The plurality of pieces of timing index information is filtered according to a filtering condition, and timing index information satisfying a preset filtering condition is retained. The filtering condition corresponds to an anomaly detection condition. A tag is added to the timing index information satisfying the preset filtering condition to form first timing index information. The tag is used for identifying the anomaly detection condition. The first timing index information is forwarded to a preset working node corresponding to the tag. anomaly detection is performed on the first timing index information on the same preset working node. It is determined whether an anomaly prompt is output.

20 Claims, 7 Drawing Sheets

(56) References Cited

U.S. PATENT DOCUMENTS 10,303,533 B1* 5/2019 Panov ................. G06F 11/0769
2003/0055960 A1* 3/2003 Hain ....................... H04L 41/00 709/224
2010/0088354 A1* 4/2010 Wu ..................... G06F 11/3409 707/827
2012/0005542 A1* 1/2012 Petersen ............. H04L 63/1425 714/48
2013/0227352 A1* 8/2013 Kumarasamy ...... G06F 11/3006 714/47.1
2014/0032694 A1* 1/2014 Cohn ...................... H04L 12/00 709/207
2014/0078133 A1 3/2014 Lee et al.
2018/0009323 A1 1/2018 Liang
2020/0053110 A1* 2/2020 Wan ...................... H04L 67/535
2022/0027215 A1* 1/2022 Chilamakuri ......... G06F 9/5027

* cited by examiner

TIMING INDEX ANOMALY DETECTION METHOD, DEVICE AND APPARATUS

TECHNICAL FIELD

The present disclosure relates to the field of software system monitoring, and in particular, to a timing index anomaly detection method, device and apparatus.

BACKGROUND

Timing data is a series of time-based data. These data points are connected into a line in a time coordinate, which may reveal the trend, regularity and anomaly of the data, and perform large data analysis and machine learning, etc. In the field of network technology, timing index anomaly detection aims to find the anomaly of various services, which is an important part of an intelligent monitoring system. With the development of technology, the scale of operation and maintenance data is large, the data explosively grows, and the types of timing indexes are increasing. However, the features of timing indexes are numerous and complex, and the content of timing indexes is more and more abundant, which brings great challenges to the timing index anomaly detection.

SUMMARY

The technical problem to be mainly solved by the present disclosure is to provide a timing index anomaly detection method, device and apparatus so as to realize the detection of timing index anomaly applied to various service scenarios.

In order to solve the above technical problem, the technical solution adopted by the present disclosure is to provide a timing index anomaly detection method. The method may include the following operations. A plurality of pieces of timing index information about a service to be detected is acquired. The plurality of pieces of timing index information is filtered according to a preset filtering condition, and timing index information satisfying the preset filtering condition is retained. The preset filtering condition corresponds to an anomaly detection condition. A tag is added to the timing index information satisfying the preset filtering condition to form first timing index information. The tag is used for identifying the anomaly detection condition. The first timing index information is forwarded to a preset working node corresponding to the tag. Anomaly detection is performed on the first timing index information on the same preset working node. It is determined whether an anomaly prompt is output.

The operation that anomaly detection is performed on the first timing index information on the same preset working node may include the following operations. The first timing index information on the same preset working node is aggregated according to a preset aggregating condition within a preset period to form second timing index information. Anomaly detection is performed on the second timing index information.

The operation that anomaly detection is performed on the second timing index information to determine whether the anomaly prompt is output may include the following operations. Anomaly detection is performed on the second timing index information. A detection result is added to the second timing index information to form third timing index information, and the third timing index information is stored. It is judged whether the third timing index information complies with an anomaly condition. When a judging result is that the third timing index information complies with the anomaly condition, an anomaly prompt is output.

There may be at least two anomaly detection conditions. The operation that the first timing index information is forwarded to the preset working node corresponding to the tag, anomaly detection is performed on the first timing index information on the same preset working node and it is determined whether the anomaly prompt is output may include the following operations. The first timing index information is forwarded to at least two preset working nodes corresponding to the tags one by one. The first timing index information on the same preset working node is aggregated according to a preset aggregating condition within a preset period to form second timing index information. Anomaly detection is performed on the second timing index information on each of the preset working nodes. It is determined whether each working node outputs an anomaly prompt.

There may be at least two anomaly detection conditions. The operation that the first timing index information is forwarded to the preset working node corresponding to the tag and anomaly detection is performed on the first timing index information on the same preset working node may include the following operations. The first timing index information containing different tags is forwarded to the same preset working node. The first timing index information on the same preset working node is filtered according to the tags. Anomaly detection is performed on the filtered first timing index information on the same preset working node.

The operation that anomaly detection is performed on the first timing index information on the same preset working node may include the following operations. Anomaly detection is performed on the first timing index information on the same preset working node according to a preset strategy that is selected according to the anomaly detection condition.

The preset strategy may include any one or a combination of a threshold trigger strategy, a jitter trigger strategy, a year-on-year trigger strategy, or a month-on-month trigger strategy.

The operation that the anomaly detection prompt is output may include the following operation. Anomaly prompt and anomaly result information is output.

In addition, the present disclosure also includes a second technical solution and provides a computer device. A memory of the computer device may be configured to store a computer program. A processor may be configured to implement the steps of a timing index anomaly detection method when executing a computer program.

In addition, the present disclosure also includes a third technical solution and provides an apparatus having a storage function. The apparatus may store a program which, when executed, is capable of implementing timing index anomaly detection.

The beneficial effects of the present disclosure are as follows. The present embodiment provides a timing index anomaly detection method. In the method, a timing index is filtered by a filtering layer. Because the filtering layer is stateless, nodes in the filtering layer may expand horizontally according to the amount of data. In the method, the pressure of different timing index information may be dispersed to different working nodes of a working layer. Therefore, the working layer may also expand horizontally. In the method, the filtering layer and the working layer are stripped, and the timing index anomaly detection is realized in a distributed way. A plurality of anomaly detection conditions may be detected simultaneously, thus avoiding the system bottleneck when the number of timing indexes is large, and reducing the pressure of a timing database. The first timing index information on the working node does not depend on the timing database, so that the normal operation of a timing detection system can be ensured in the downtime of the timing database due to excessive anomaly detection conditions and large amount of timing index information.

BRIEF DESCRIPTION OF THE DRAWINGS

In order to describe the technical solutions in the embodiments of the present disclosure more clearly, the drawings required to be used in descriptions about the embodiments will be simply introduced below. It is apparent that the drawings in the following descriptions are only some embodiments of the present disclosure. Those skilled in the art may further obtain other drawings according to these drawings without creative work.

DETAILED DESCRIPTION OF THE EMBODIMENTS

In order to make those skilled in the art better understand the solutions of the present disclosure, the technical solutions in the embodiments of the present disclosure will be clearly and completely described below with reference to the drawings in the embodiments of the present disclosure.

The terms "first", "second" and "third" in the present disclosure are only adopted for description and should not be understood to indicate or imply relative importance or implicitly indicate the number of indicated technical features. Therefore, a feature defined by "first", "second" and "third" may explicitly indicate or implicitly include at least one such feature. In the descriptions of the present disclosure, "multiple" means at least two, e.g. two or three, unless otherwise limited definitely and specifically.

Figure 1:
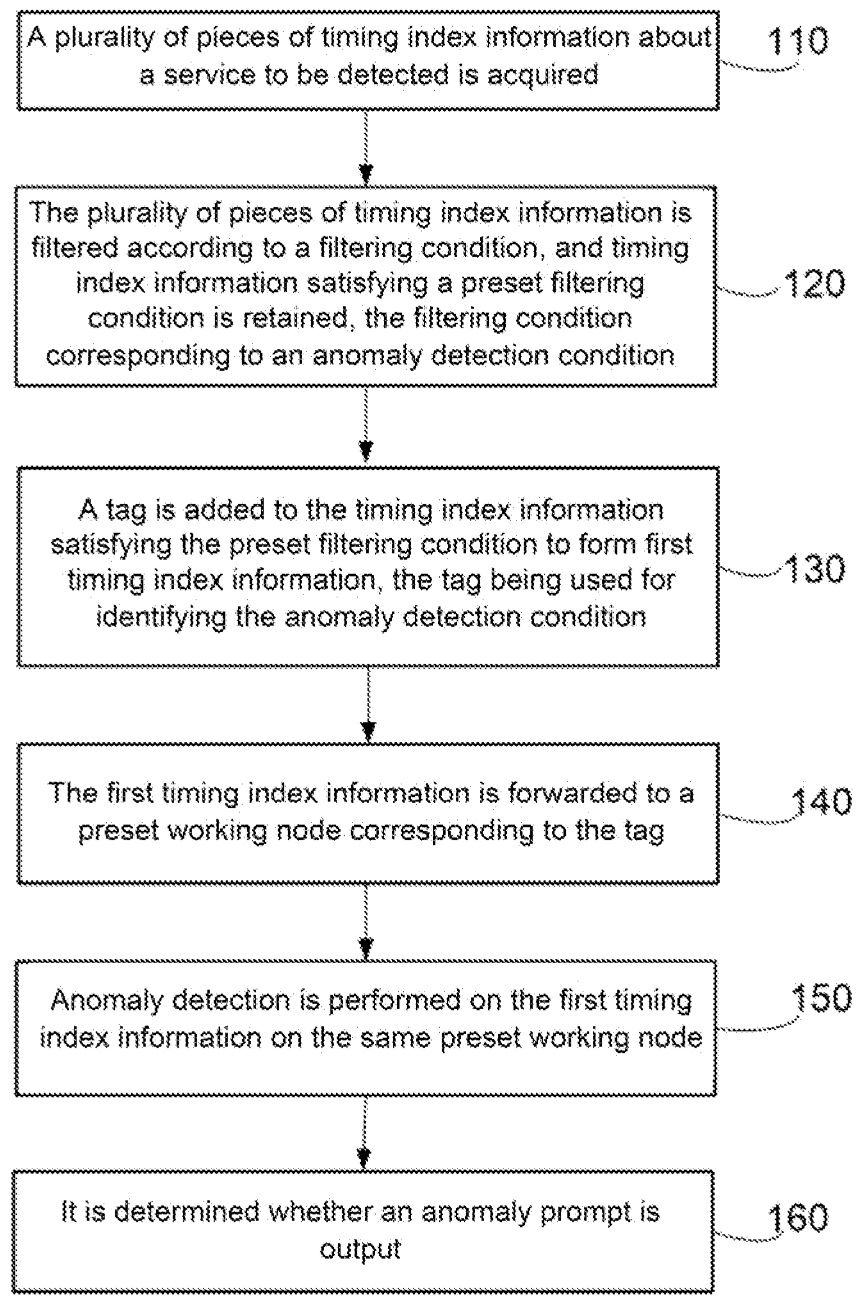
FIG. 1 is a flow diagram of a first embodiment of a timing index anomaly detection method according to the present disclosure.

Referring to FIG. 1, FIG. 1 is a flow diagram of a first embodiment of a timing index anomaly detection method according to the present disclosure. The present implementation mode includes the following steps.

In step 110, a plurality of pieces of timing index information about a service to be detected is acquired.

In the embodiment of the present disclosure, the service to be detected may be a consumption order quantity, a usage condition of traffic, an operation condition of a voice device, etc. The timing index information may contain an index name, a time stamp, dimension information of a service, a state, and an index value. The index name is mainly used to distinguish the type of the service to be detected. The acquired timing index information is simultaneously stored in a timing database.

In step 120, the plurality of pieces of timing index information is filtered according to a filtering condition, and timing index information satisfying a preset filtering condition is retained. The filtering condition corresponds to an anomaly detection condition.

In the embodiment of the present disclosure, a filtering layer filters timing indexes according to a preset filtering condition. There may be one or more filtering conditions. The main function of the filtering layer is to filter out timing index information complying with a preset filtering condition in multiple dimensions of the timing index information. The preset filtering condition is a predetermined filtering condition. Since the filtering layer is stateless, only a simple logic of processing whether the timing index information matches the preset filtering condition is required, so nodes in the filtering layer may expand horizontally according to the amount of data. The filtering condition may be the same as or different from the anomaly detection condition.

In step 130, a tag is added to the timing index information satisfying the preset filtering condition to form first timing index information. The tag is used for identifying the anomaly detection condition.

In the embodiment of the present disclosure, a tag is added to the filtered timing index information satisfying the preset filtering condition, the tag is used for distinguishing the anomaly detection conditions, and there may be one or more tags on the same timing index information. The number of tags is the same as the number of anomaly detection conditions in the embodiment of the present disclosure.

In step 140, the first timing index information is forwarded to a preset working node corresponding to the tag.

In the embodiment of the present disclosure, the first timing index information is forwarded to a preset working node of a working layer, and a hash routing rule is used. The method can determine that the first timing index information is processed on the preset working node by calculating modulo. The above method may disperse the pressure of the timing index information on nodes of different working layers, so that the working layers may expand horizontally. When the device stops running, the working nodes of the working layer may be manually increased, and the working layer may expand horizontally after starting the device.

In step 150, anomaly detection is performed on the first timing index information on the same preset working node.

In the embodiment of the present disclosure, the anomaly detection condition is identified according to the tag, and anomaly detection is performed on the first timing index information according to the anomaly detection condition. In the embodiment of the present disclosure, the first timing index information does not depend on the timing database and can be independently operated, and may be mutually supported with the timing database data, and anomaly detection can be normally performed even in the downtime of the timing database.

In step 160, it is determined whether an anomaly prompt is output.

In the embodiment of the present disclosure, it is determined whether an anomaly prompt is output according to an anomaly detection result.

The present embodiment provides a timing index anomaly detection method. In the method, a filtering layer for filtering is stateless, so nodes in the filtering layer may expand horizontally according to the amount of data. In the method, the pressure of timing indexes is dispersed to different working nodes of a working layer. Therefore, the working layer may also expand horizontally. In the method, the filtering layer and the working layer are stripped, and the timing index anomaly detection is realized in a distributed way. A plurality of anomaly detection conditions may be detected simultaneously, thus avoiding the system bottleneck when the number of timing indexes is large, and reducing the pressure of a timing database. The first timing index information on the working node does not depend on the timing database, so that the normal operation of a timing detection system can be ensured in the downtime of the timing database due to excessive anomaly detection conditions and large amount of timing index information. The detection of timing index anomaly applied to various service scenarios is realized.

Figure 2:
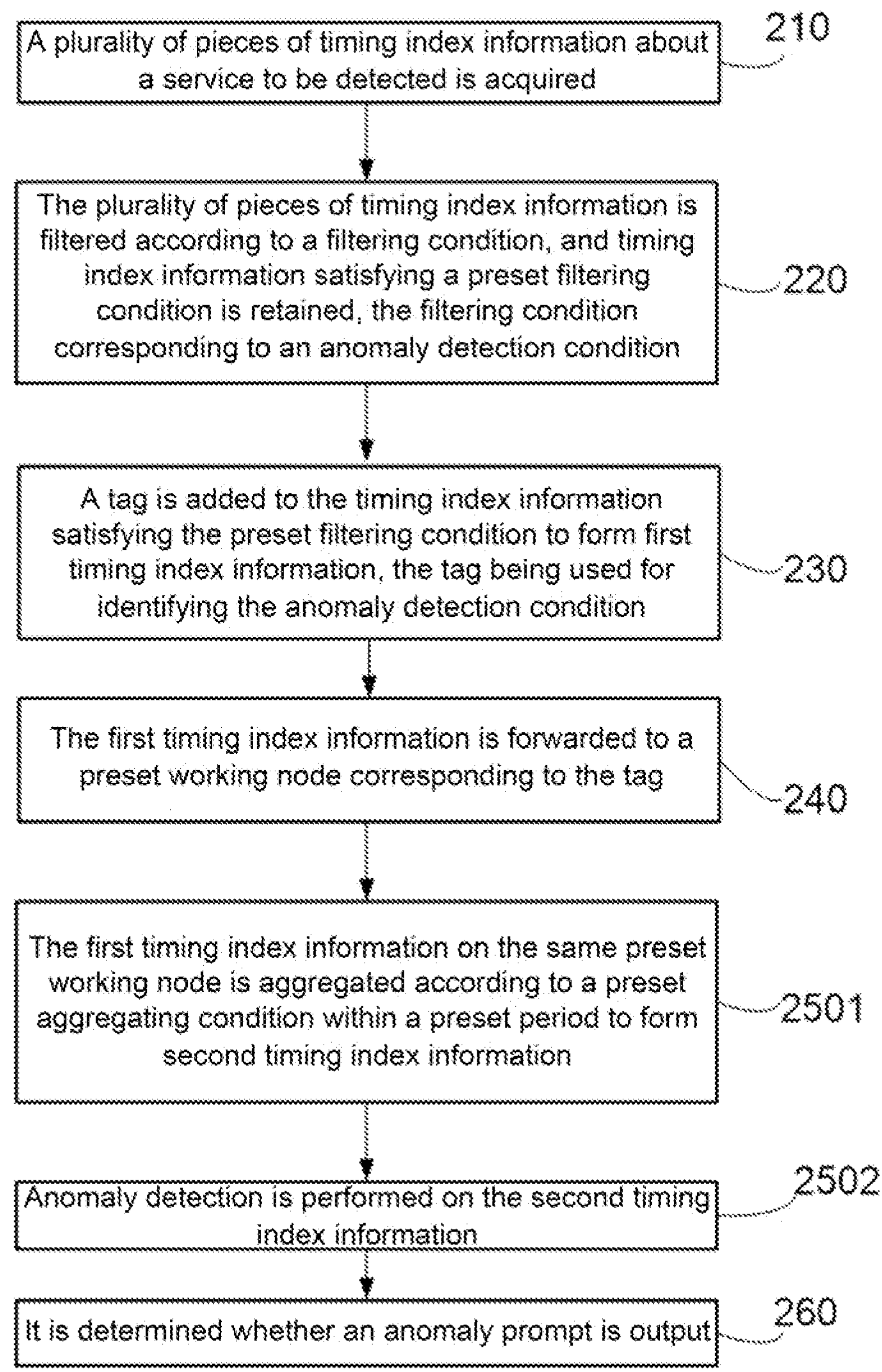
FIG. 2 is a flow diagram of a second embodiment of a timing index anomaly detection method according to the present disclosure.

In a second embodiment of the present disclosure, referring to FIG. 2, the timing index anomaly detection method includes the following steps.

In step 210, a plurality of pieces of timing index information about a service to be detected is acquired.

In the embodiment of the present disclosure, the service to be detected is a consumption order quantity. Two pieces of timing index information are acquired. The first timing index information contains an index name “order quantity”, a time stamp “1234”, dimension information about a service “item2”, a state “success”, and an index value “2”. The second timing index information contains an index name “order quantity”, a time stamp “1234”, dimension information about a service “item2”, a state “success”, and an index value “9”. The acquired timing index information is simultaneously stored in a timing database. The embodiment of the present disclosure is merely an example. There may be 0 or more groups of dimension information about a service to be detected. Each group has two values (tagKey, tagValue), tagKey describes the meaning of a value, and tagValue describes a value of a corresponding scenario, such as (item, orange) or (host, machineA).

In step 220, the plurality of pieces of timing index information is filtered according to a filtering condition, and timing index information satisfying a preset filtering condition is retained. The filtering condition corresponds to an anomaly detection condition.

In the embodiment of the present disclosure, if an anomaly detection condition is that the number of successful orders within two minutes is more than 10, it is considered to be an anomaly. Therefore, in the embodiment of the present disclosure, a preset filtering condition is timing index information indicating that an order state is success. In the embodiment of the present disclosure, only the timing index information indicating that the order state is success within two minutes is reserved for subsequent operations. For example, in the embodiment of the present disclosure, two pieces of timing index information are filtered according to a filtering condition. The first timing index information indicating that the order state is success and the second timing index information indicating that the order state is success are reserved.

In step 230, a tag is added to the timing index information satisfying the preset filtering condition to form first timing index information. The tag is used for identifying the anomaly detection condition.

In the embodiment of the present disclosure, a tag “Tag1” is used for identifying an anomaly detection condition that the number of successful orders is more than 10 within two minutes, the tag “Tag1” is added to the first timing index information filtered, and the tag “Tag1” is added to the second timing index information to form the first timing index information. In the embodiment of the present disclosure, the first timing index information corresponds to the timing index information before filtering. The tag in the embodiment of the present disclosure may be specifically set according to service scenario requirements, such as machine A.

In step 240, the first timing index information is forwarded to a preset working node corresponding to the tag.

In the embodiment of the present disclosure, two pieces of first timing index information with a tag of Tag1 are forwarded to a first working node according to a hash routing rule. The embodiment of the present disclosure is merely an example. In other embodiments, a plurality of first timing index information containing a tag of Tag1 may be sent and forwarded to the first working node.

In step 2501, the first timing index information on the same preset working node is aggregated according to a preset aggregating condition within a preset period to form second timing index information.

In the embodiment of the present disclosure, the first timing index information with a tag of Tag1 on the first working node is aggregated according to an aggregation condition within a preset period of two minutes. In the embodiment of the present disclosure, the aggregation condition is the sum of the number of successful orders. There are two pieces of first timing index information with a tag of “Tag1”, one piece of first timing index information with a tag of “Tag1” has an index value of “2” in the state “order quantity” and “success”, and the other first timing index information with a tag of “Tag1” has an index value of “9” in the state “order quantity” and “success”. Index data of the two pieces of first timing index information are aggregated, the number of successful orders is 11, and second timing index information indicating that the number of failed orders is 11 is obtained.

In step 2502, anomaly detection is performed on the second timing index information.

In the embodiment of the present disclosure, the anomaly detection condition is that the number of successful orders within two minutes is more than 10. Anomaly detection is performed on the second timing index information according to the anomaly detection condition, and the number of successful orders 11 within this period of two minutes is compared with 10. In the embodiment of the present disclosure, when anomaly detection is performed, the tag on the second timing index information may be removed; or in the above step, the tag on the first timing index information may be removed at the time of aggregation.

In step 260, it is determined whether an anomaly prompt is output.

In the embodiment of the present disclosure, the number of successful orders within two minutes is compared with 10 to judge whether it is abnormal. In the embodiment of the present disclosure, if the number of successful orders within two minutes 11 is more than 10, the anomaly detection condition is satisfied, and an anomaly prompt is output. If the anomaly detection condition is not satisfied, an anomaly prompt is not output.

The present embodiment provides a timing index anomaly detection method. In the method, first timing index information with the same tag on the same preset working node can be aggregated according to a preset aggregation condition within a preset period, so as to realize the integration of timing index information, and the anomaly detection of timing indexes in more service scenarios can be satisfied.

Figure 3:
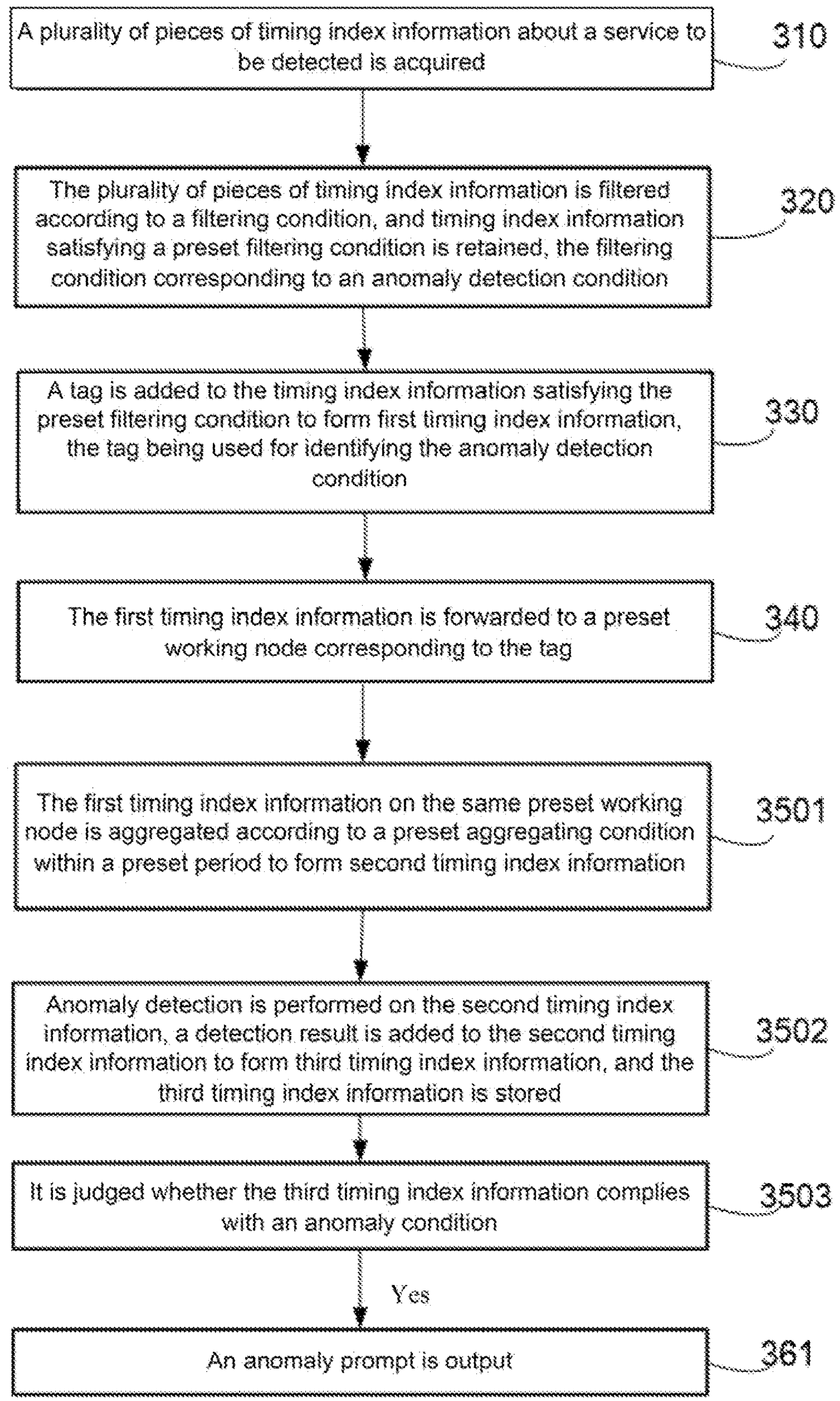
FIG. 3 is a flow diagram of a third embodiment of a timing index anomaly detection method according to the present disclosure.

In another embodiment of the present disclosure, as shown in FIG. 3, the timing index anomaly detection method includes the following steps.

In step 310, a plurality of pieces of timing index information about a service to be detected is acquired.

In the embodiment of the present disclosure, the service to be detected is a consumption order quantity. Three pieces of timing index information are acquired within two minutes. The first timing index information contains an index name "order quantity", a time stamp "1234", dimension information about a service "item2", a state "failure", and an index value "2". The second timing index information contains an index name "order quantity", a time stamp "1234", dimension information about a service "item2", a state "failure", and an index value "1". The third timing index information contains an index name "order quantity", a time stamp "1234", dimension information about a service "item2", a state "success", and an index value "1". The acquired timing index information is simultaneously stored in a timing database. The embodiment of the present disclosure is merely an example. There may be 0 or more groups of dimension information about a service to be detected. Each group has two values (tagKey, tagValue), tagKey describes the meaning of a value, and tagValue describes a value of a corresponding scenario, such as (item, orange) or (host, machineA).

In step 320, the plurality of pieces of timing index information is filtered according to a filtering condition, and timing index information satisfying a preset filtering condition is retained. The filtering condition corresponds to an anomaly detection condition.

In the embodiment of the present disclosure, if an anomaly detection condition is that the number of failed orders within two minutes is greater than the number of failed orders within the previous two minutes by 1, it is considered to be an anomaly. Therefore, in the embodiment of the present disclosure, a preset filtering condition is timing index information indicating that an order state is failure. In the embodiment of the present disclosure, only the timing index information indicating that the order state is failure within two minutes is reserved for subsequent operations. For example, in the embodiment of the present disclosure, three pieces of timing index information are filtered according to a filtering condition. The first timing index information indicating that the order state is failure and the second timing index information indicating that the order state is failure are reserved.

In step 330, a tag is added to the timing index information satisfying the preset filtering condition to form first timing index information. The tag is used for identifying the anomaly detection condition.

In the embodiment of the present disclosure, a tag "Tag1" is used for identifying an anomaly detection condition that the number of failed orders within two minutes is greater than the number of failed orders within the previous two minutes by 1, the tag "Tag1" is added to the first timing index information filtered, and the tag "Tag1" is added to the second timing index information to form the first timing index information. In the embodiment of the present disclosure, the first timing index information corresponds to the timing index information before filtering. The tag in the embodiment of the present disclosure may be specifically set according to service scenario requirements, such as machine A.

In step 340, the first timing index information is forwarded to a preset working node corresponding to the tag.

In the embodiment of the present disclosure, two pieces of first timing index information with a tag of Tag1 are forwarded to a first working node according to a hash routing rule. The embodiment of the present disclosure is merely an example. In other embodiments, a plurality of first timing index information containing a tag of Tag1 may be sent and forwarded to the first working node.

In step 3501, the first timing index information on the same preset working node is aggregated according to a preset aggregating condition within a preset period to form second timing index information.

In the embodiment of the present disclosure, the first timing index information with a tag of Tag1 on the first working node is aggregated according to an aggregation condition within a preset period of two minutes. In the embodiment of the present disclosure, the aggregation condition is the sum of the number of failed orders. There are two pieces of first timing index information with a tag of "Tag1", one piece of first timing index information with a tag of "Tag1" has an index value of "2" in the state "order quantity" and "failure", and the other first timing index information with a tag of "Tag1" has an index value of "1" in the state "order quantity" and "failure". Index data of the two pieces of first timing index information are aggregated, the number of failed orders is 3, and second timing index information indicating that the number of failed orders is 3 is obtained.

In step 3502, anomaly detection is performed on the second timing index information, a detection result is added to the second timing index information to form third timing index information, and the third timing index information is stored.

In the embodiment of the present disclosure, the anomaly detection condition is that the number of failed orders within two minutes is greater than the number of failed orders within the previous two minutes by 1. In the embodiment of the present disclosure, the number of failed orders within the previous two minutes is 1, anomaly detection is performed on the second timing index information according to the anomaly detection condition, and the number of failed orders within the previous two minutes 1 is subtracted from the number of failed orders within the current two minutes 3, that is, the number of failed orders within two minutes is greater than the number of failed orders within the previous two minutes by 2. A detection result is added to the second timing index information to form third timing index information, and the third timing index information is stored for use in the next stage of anomaly detection.

In step 3503, it is judged whether the third timing index information complies with an anomaly condition.

In the embodiment of the present disclosure, the third timing index information is compared with the anomaly detection condition to judge whether it is abnormal. In the embodiment of the present disclosure, the difference 2 between the number of failed orders within two minutes and the number of failed orders within the previous two minutes is greater than 1, so the anomaly detection condition is satisfied.

In step 361, if yes, an anomaly prompt is output.

If the anomaly detection condition is satisfied, an anomaly prompt is output. If the anomaly detection condition is not satisfied, an anomaly prompt is not output.

Figure 4:
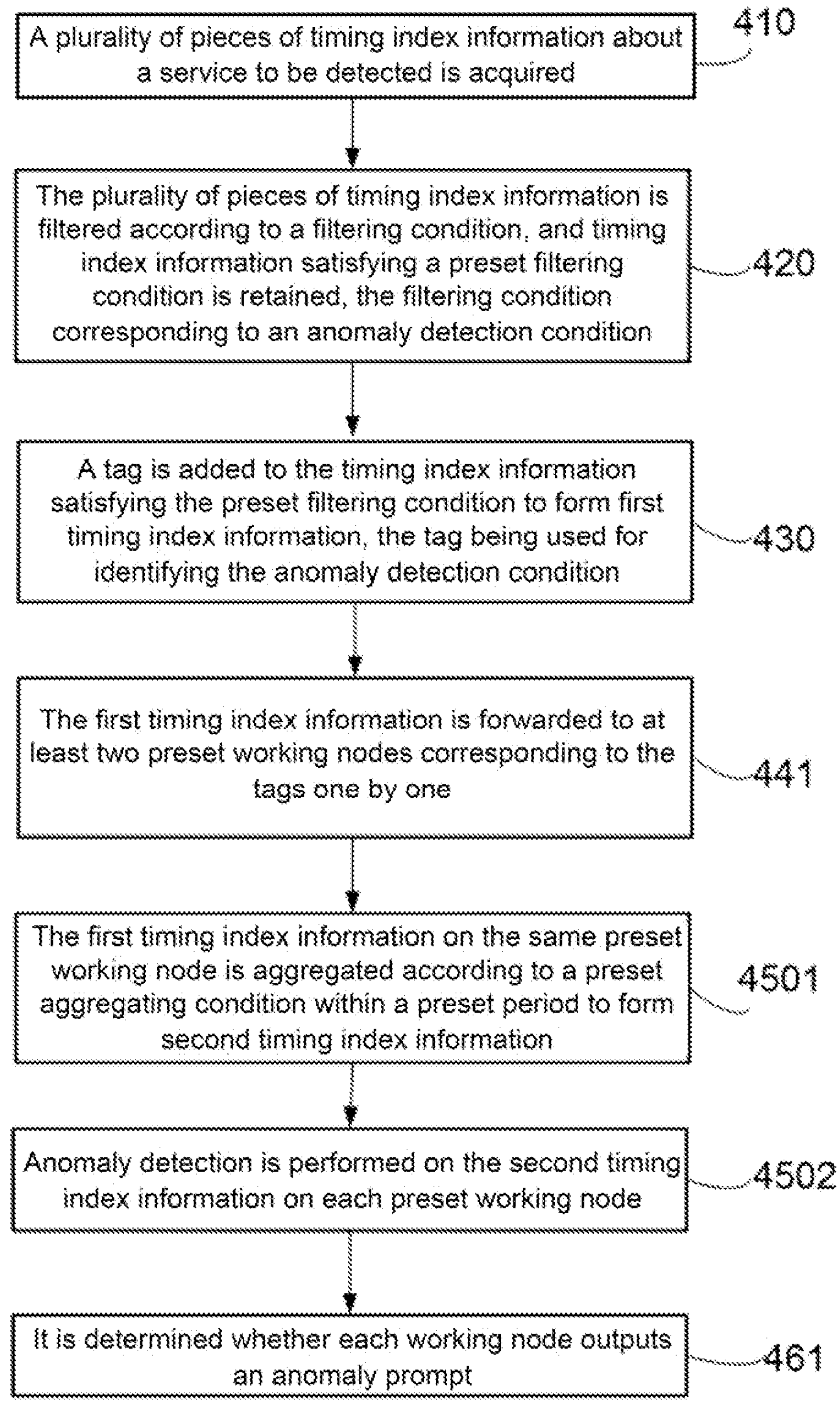
FIG. 4 is a flow diagram of a fourth embodiment of a timing index anomaly detection method according to the present disclosure.

In yet another embodiment of the present disclosure, there are at least two anomaly detection conditions, and there may, for example, be two, three, four or more than five anomaly detection conditions. The at least two anomaly detection conditions may be performed simultaneously. For example, in the embodiment of the present disclosure, as shown in FIG. 4, the timing index anomaly detection method includes the following steps.

In step 410, a plurality of pieces of timing index information about a service to be detected is acquired.

In the embodiment of the present disclosure, the service to be detected is a consumption order quantity. Three pieces of timing index information are acquired. The first timing index information contains an index name "order quantity", a time stamp "1234", dimension information about a service "item2", a state "failure", and an index value "2". The second timing index information contains an index name "order quantity", a time stamp "1234", dimension information about a service "item2", a state "failure", and an index value "1". The third timing index information contains an index name "order quantity", a time stamp "1234", dimension information about a service "item2", a state "failure", and an index value "11". The acquired timing index information is simultaneously stored in a timing database. The embodiment of the present disclosure is merely an example. There may be 0 or more groups of dimension information about a service to be detected. Each group has two values (tagKey, tagValue), tagKey describes the meaning of a value, and tagValue describes a value of a corresponding scenario, such as (item, orange) or (host, machineA).

In step 420, the plurality of pieces of timing index information is filtered according to a filtering condition, and timing index information satisfying a preset filtering condition is retained. The filtering condition corresponds to an anomaly detection condition.

In the embodiment of the present disclosure, if the first anomaly detection condition is that the number of failed orders within two minutes is greater than the number of failed orders within the previous two minutes by 1, it is considered to be an anomaly. If the second anomaly detection condition is that the number of failed orders within two minutes is more than 10, it is considered to be an anomaly. Therefore, in the embodiment of the present disclosure, a preset filtering condition is timing index information indicating that an order state is failure. In the embodiment of the present disclosure, only the timing index information indicating that the order state is failure within two minutes is reserved for subsequent operations. For example, in the embodiment of the present disclosure, three pieces of timing index information are filtered according to a filtering condition. The first timing index information indicating that the order state is failure, the second timing index information indicating that the order state is failure and the third timing index information indicating that the order state is failure are reserved.

In step 430, a tag is added to the timing index information satisfying the preset filtering condition to form first timing index information. The tag is used for identifying the anomaly detection condition.

In the embodiment of the present disclosure, a tag "Tag 1" is used for identifying an anomaly detection condition that the number of failed orders within two minutes is greater than the number of failed orders within the previous two minutes by 1, and a tag "Tag 2" is used for identifying an anomaly detection condition that the number of failed orders within two minutes is more than 10. The tag Tag1 is added to the filtered first timing index information, and the tag Tag1 is added to the second timing index information to form the first timing index information. The tag Tag2 is added to the filtered third timing index information to form the first timing index information. In the embodiment of the present disclosure, the first timing index information corresponds to the timing index information before filtering. The tag in the embodiment of the present disclosure may be specifically set according to service scenario requirements, such as machine A.

In step 441, the first timing index information is forwarded to at least two preset working nodes corresponding to the tags one by one.

In the embodiment of the present disclosure, timing index information with the same tag is forwarded to the same preset working node. Two pieces of first timing index information with a tag of Tag1 are forwarded to a first working node according to a hash routing rule. First timing index information with a tag of Tag2 is forwarded to a second working node.

In step 4501, the first timing index information on the same preset working node is aggregated according to a preset aggregating condition within a preset period to form second timing index information.

In the embodiment of the present disclosure, the first timing index information with a tag of Tag1 on the first working node is aggregated according to an aggregation condition within a preset period of two minutes. In the embodiment of the present disclosure, the aggregation condition is the sum of the number of failed orders. There are two pieces of first timing index information with a tag of "Tag1", one piece of first timing index information with a tag of "Tag1" has an index value of "2" in the state "order quantity" and "failure", and the other first timing index information with a tag of "Tag1" has an index value of "1" in the state "order quantity" and "failure". Index data of the two pieces of first timing index information are aggregated, the number of failed orders is 3, and second timing index information indicating that the number of failed orders is 3 is obtained. The first timing index information with a tag of Tag2 on the second working node is aggregated according to an aggregation condition within a preset period of two minutes. In the embodiment of the present disclosure, the aggregation condition is the sum of the number of successful orders when the number of failed orders is more than 10. There is one piece of first timing index information with a tag of Tag2 having an index value of "11" in the state "order quantity" and "failure", index data of the first timing index information are aggregated, the number of failed orders is 11, and second timing index information indicating that the number of successful orders is 11 is obtained.

In step 4502, anomaly detection is performed on the second timing index information on each preset working node.

In the embodiment of the present disclosure, anomaly detection is performed on the second timing index according to the anomaly detection condition, a tag "Tag 1" is used for identifying an anomaly detection condition that the number of failed orders within two minutes is greater than the number of failed orders within the previous two minutes by 1, and a tag "Tag 2" is used for identifying an anomaly detection condition that the number of failed orders within two minutes is more than 10. In the embodiment of the present disclosure, the number of failed orders within the previous two minutes is 1, anomaly detection is performed on the second timing index information with a tag of Tag1 on the first working node according to the anomaly detection condition, and the number of failed orders within the previous two minutes 1 is subtracted from the number of failed orders within the current two minutes 3, that is, the number of failed orders within two minutes is greater than the number of failed orders within the previous two minutes by 2. Anomaly detection is performed on the second timing index information with a tag of Tag2 on the second working node according to the anomaly detection condition, and the number of failed orders 11 within this period of two minutes is compared with 10.

In step 461, it is determined whether each working node outputs an anomaly prompt.

In the embodiment of the present disclosure, the second timing index information is compared with the anomaly detection condition on the first working node to judge whether it is abnormal. In the embodiment of the present disclosure, the difference 2 between the number of failed orders within two minutes and the number of failed orders within the previous two minutes is greater than 1, so the anomaly detection condition is satisfied, and an anomaly prompt is output. If the anomaly detection condition is not satisfied, an anomaly prompt is not output. The number of failed orders within two minutes is compared with 10 on the second working node to judge whether it is abnormal. In the embodiment of the present disclosure, if the number of failed orders within two minutes 11 is more than 10, the anomaly detection condition is satisfied, and an anomaly prompt is output. If the anomaly detection condition is not satisfied, an anomaly prompt is not output.

The embodiment of the present disclosure provides a timing index anomaly detection method. Since timing indexes with different detection conditions can be sent to different nodes for processing, working nodes may expand horizontally, and the application scope and scenario of the method are widened.

Figure 5:
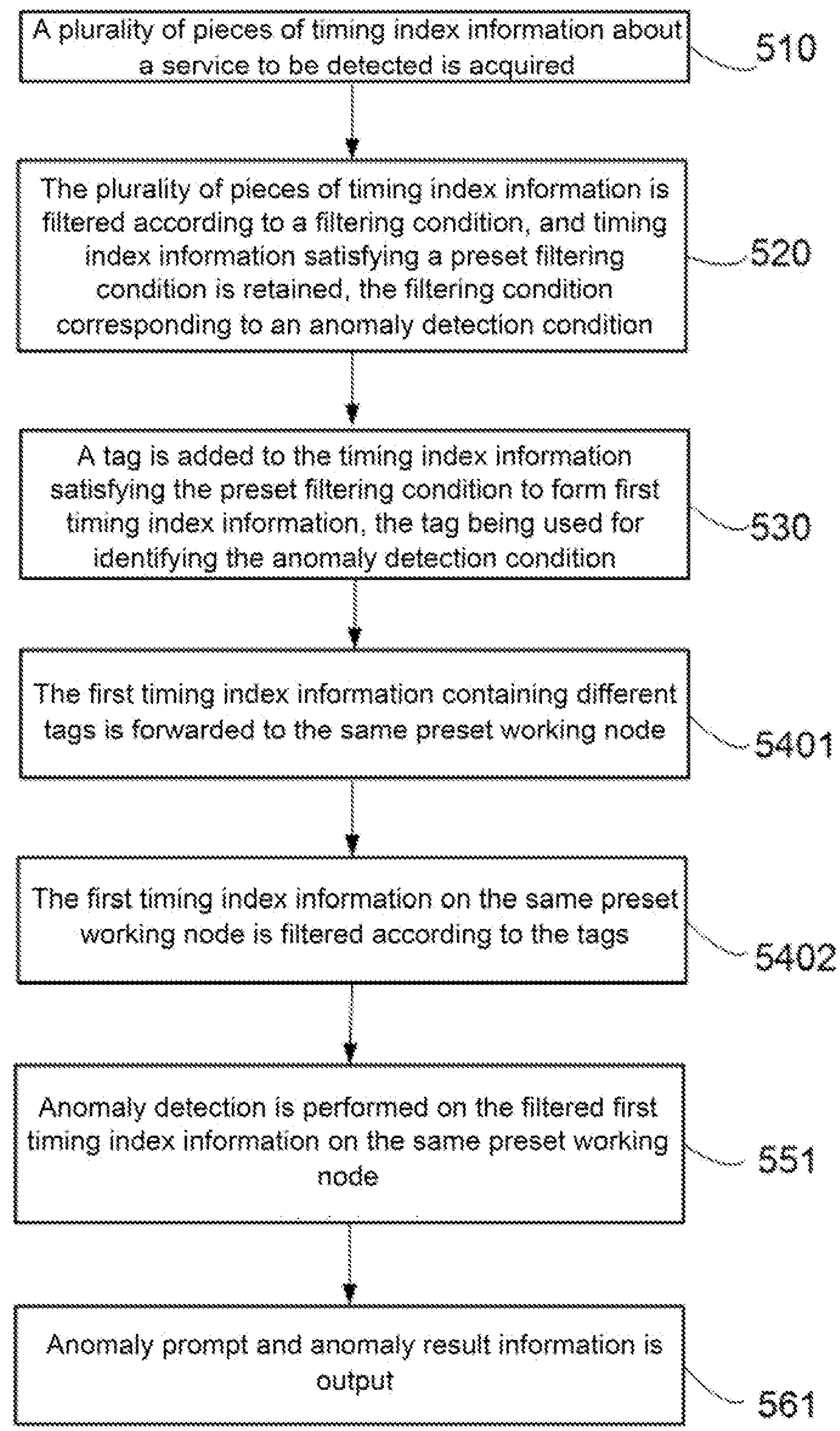
FIG. 5 is a flow diagram of a fifth embodiment of a timing index anomaly detection method according to the present disclosure.

In yet another embodiment of the present disclosure, as shown in FIG. 5, the timing index anomaly detection method includes the following steps.

In step 510, a plurality of pieces of timing index information about a service to be detected is acquired.

In the embodiment of the present disclosure, the service to be detected is a consumption order quantity. Two pieces of timing index information are acquired. The first timing index information contains an index name “order quantity”, a time stamp “1234”, dimension information about a service “item2”, a state “failure”, and an index value “2”. The second timing index information contains an index name “order quantity”, a time stamp “1234”, dimension information about a service “item2”, a state “failure”, and an index value “11”. The acquired timing index information is simultaneously stored in a timing database. The embodiment of the present disclosure is merely an example. There may be 0 or more groups of dimension information about a service to be detected. Each group has two values (tagKey, tagValue), tagKey describes the meaning of a value, and tagValue describes a value of a corresponding scenario, such as (item, orange) or (host, machineA).

In step 520, the plurality of pieces of timing index information is filtered according to a filtering condition, and timing index information satisfying a preset filtering condition is retained. The filtering condition corresponds to an anomaly detection condition.

In the embodiment of the present disclosure, there are at least two anomaly detection conditions. If the first anomaly detection condition is that the number of failed orders within two minutes is greater than the number of failed orders within the previous two minutes by 1, it is considered to be an anomaly. If the second anomaly detection condition is that the number of failed orders within two minutes is more than 10, it is considered to be an anomaly. Therefore, in the embodiment of the present disclosure, a preset filtering condition is timing index information indicating that an order state is failure. In the embodiment of the present disclosure, only the timing index information indicating that the order state is failure within two minutes is reserved for subsequent operations. For example, in the embodiment of the present disclosure, two pieces of timing index information are filtered according to a filtering condition. The first timing index information indicating that the order state is failure and the second timing index information indicating that the order state is failure are reserved.

In step 530, a tag is added to the timing index information satisfying the preset filtering condition to form first timing index information. The tag is used for identifying the anomaly detection condition.

In the embodiment of the present disclosure, a tag “Tag 1” is used for identifying an anomaly detection condition that the number of failed orders within two minutes is greater than the number of failed orders within the previous two minutes by 1, and a tag “Tag 2” is used for identifying an anomaly detection condition that the number of failed orders within two minutes is more than 10. The tag Tag1 is added to the filtered first timing index information to form the first timing index information. The tag Tag2 is added to the filtered second timing index information to form the first timing index information. In the embodiment of the present disclosure, the first timing index information corresponds to the timing index information before filtering. The tag in the embodiment of the present disclosure may be specifically set according to service scenario requirements, such as machine A.

In step 5401, the first timing index information containing different tags is forwarded to the same preset working node.

In the embodiment of the present disclosure, the first timing index information with a tag of Tag1 is forwarded to a first working node according to a hash routing rule. First timing index information with a tag of Tag2 is also forwarded to the first working node.

In the embodiment of the present disclosure, two anomaly detection conditions and one working node are taken as an example. In other embodiments, there may be a plurality of anomaly detection conditions and more than two working nodes when the number of anomaly detection conditions is greater than the number of working nodes, or when the number of anomaly detection conditions is equal to the number of working nodes, or the number of anomaly detection conditions is less than the number of working nodes.

For example, when the anomaly detection conditions are condition 1, condition 2, condition 3, and condition 4 respectively, tags “01”, “02”, “03”, and “04” are respectively used for identifying first timing index information of timing index information, and there are three working nodes: working node 1, working node 2 and working node 3 respectively. In the embodiment of the present disclosure, the first timing index information containing tag “01” and the first timing index information containing tag “02” may be sent to working node 1 respectively, the first timing index information containing tag “03” may be sent to working node 2, and the first timing index information containing tag “04” may be sent to working node 3.

In step 5402, the first timing index information on the same preset working node is filtered according to the tags.

In the embodiment of the present disclosure, when the anomaly detection condition that the number of failed orders within two minutes is greater than the number of failed orders within the previous two minutes by 1 is executed on the first working node, only the first timing index information with a tag of Tag1 is retained. When the anomaly detection condition that the number of failed orders within two minutes is more than 10 is executed, only the first timing index information with a tag of Tag2 is retained.

If working node 1 contains the first timing index information with tag "01" and the first timing index information with tag "02", only the first timing index information with tag "01" may be retained by filtering in the embodiment of the present disclosure. Only the first timing index information with tag "02" may also be retained by filtering.

In step 551, anomaly detection is performed on the filtered first timing index information on the same preset working node.

In the embodiment of the present disclosure, the filtered first timing index information on the first working node is detected according to the anomaly detection condition. When the first timing index information with a tag of Tag1 is retained after filtering, the detection is performed according to the detection condition that the number of failed orders within two minutes is greater than the number of failed orders within the previous two minutes by 1. In the embodiment of the present disclosure, the number of failed orders within the previous two minutes is 1, and the number of failed orders within the previous two minutes 1 is subtracted from the number of failed orders within the current two minutes 2, that is, the number of failed orders within two minutes is greater than the number of failed orders within the previous two minutes by 1.

In step 561, anomaly prompt and anomaly result information is output.

In the embodiment of the present disclosure, the difference 1 between the number of failed orders within two minutes and the number of failed orders within the previous two minutes of the first timing index information with a tag Tag1 is not greater than 1, so the anomaly detection condition is not satisfied, and an anomaly prompt is not output. If the anomaly detection condition is satisfied, an anomaly prompt is output.

The present embodiment provides a timing index anomaly detection method. With the method, first timing index information containing different tags can be forwarded to the same preset working node and filtered on the same preset node according to the tags, so that anomaly detection of a plurality of service timing indexes may be processed simultaneously on one working node, the efficiency of anomaly detection is improved, the case where the number of anomaly detection conditions is greater than the number of working nodes is improved, and anomaly detection can still be performed.

Figure 6:
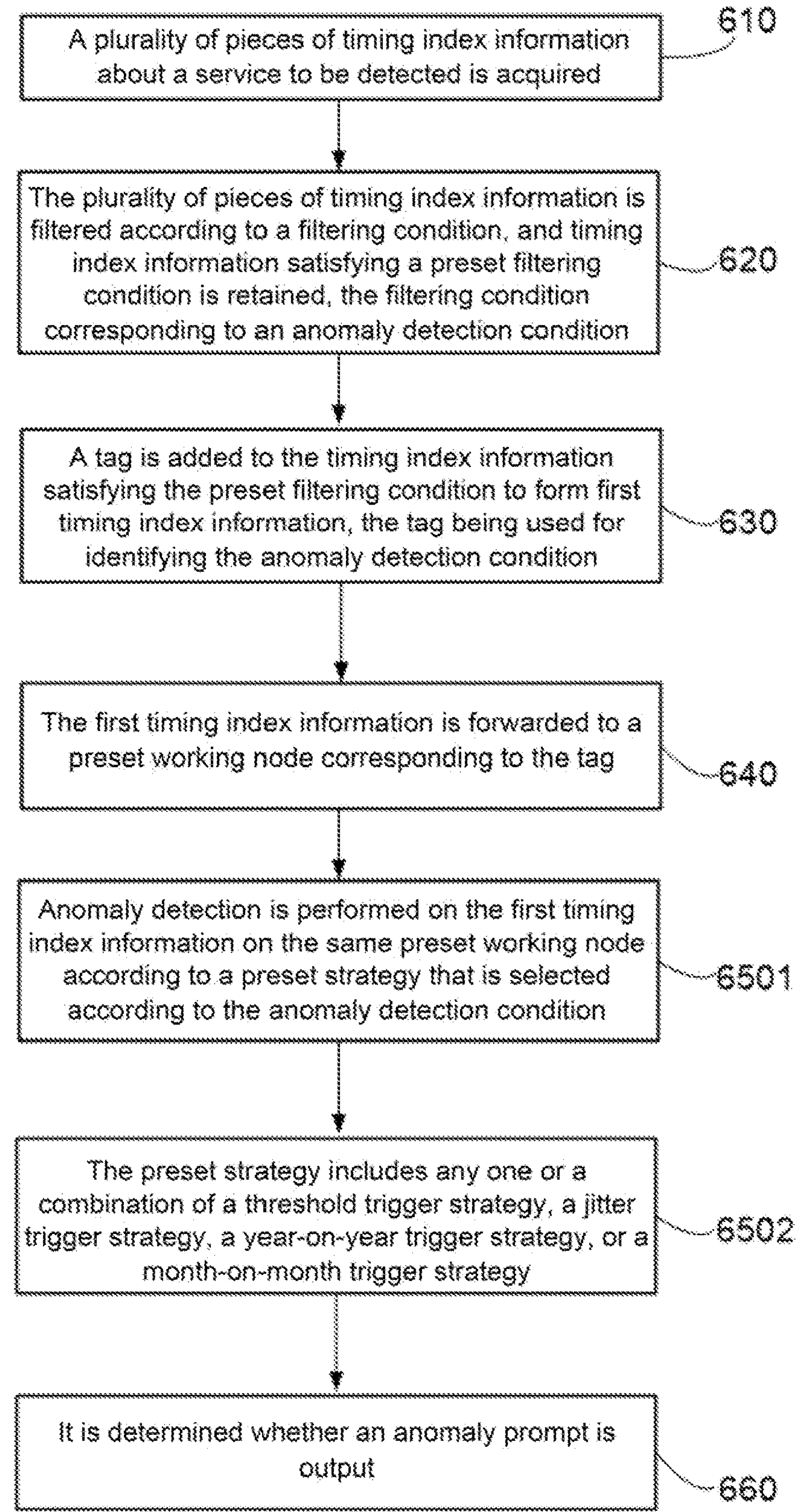
FIG. 6 is a flow diagram of a sixth embodiment of a timing index anomaly detection method according to the present disclosure.

In yet another embodiment of the present disclosure, as shown in FIG. 6, the operation that anomaly detection is performed on the first timing index information on the same preset working node includes the following operations.

In step 610, a plurality of pieces of timing index information about a service to be detected is acquired.

The detailed process is the same as that of the above embodiment, and will not be repeated herein.

In step 620, the plurality of pieces of timing index information is filtered according to a filtering condition, and timing index information satisfying a preset filtering condition is retained. The filtering condition corresponds to an anomaly detection condition.

The detailed process is the same as that of the above embodiment, and will not be repeated herein.

In step 630, a tag is added to the timing index information satisfying the preset filtering condition to form first timing index information. The tag is used for identifying the anomaly detection condition.

The detailed process is the same as that of the above embodiment, and will not be repeated herein.

In step 640, the first timing index information is forwarded to a preset working node corresponding to the tag.

The detailed process is the same as that of the above embodiment, and will not be repeated herein.

In step 6501, anomaly detection is performed on the first timing index information on the same preset working node according to a preset strategy that is selected according to the anomaly detection condition.

In step 6502, the preset strategy includes any one or a combination of a threshold trigger strategy, a jitter trigger strategy, a year-on-year trigger strategy, or a month-on-month trigger strategy.

The threshold trigger strategy is used for determining a current time anomaly detection result according to a real-time abnormal threshold and current timing index data. In the year-on-year trigger strategy or the month-on-month trigger strategy, year-on-year refers to a comparison at a certain same time point in adjacent time periods. Month-on-month is a comparison in adjacent time periods. The preset strategy selected in the anomaly detection condition may be any one or a combination of several strategies. For example, when the anomaly detection condition is a timing index that the number of successful orders is less than 10, the threshold trigger strategy may be selected. When the anomaly detection condition is that the number of failed orders is greater than the previous number by 1, the month-on-month trigger strategy may be selected. When the anomaly detection condition is that the number of successful orders is greater than the previous number by 1 and more than 10, the threshold trigger strategy or the month-on-month trigger strategy may be selected.

In step 660, it is determined whether an anomaly prompt is output.

The detailed process is the same as that of the above embodiment, and will not be repeated herein.

The present embodiment provides a timing index anomaly detection method. In the method, when anomaly detection is performed on a timing index, a plurality of trigger strategies may be conveniently configured, and a trigger relationship between the strategies is formulated, that is, the trigger is satisfied simultaneously or any one trigger is satisfied, and the requirements of timing index anomaly detection in different scenarios are further satisfied.

Figure 7:
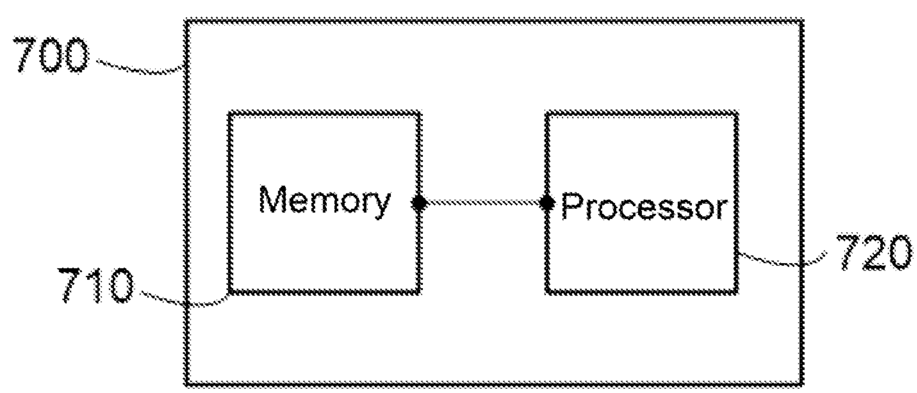
FIG. 7 is a schematic structure diagram of an embodiment of a computer device according to the present disclosure.

Referring to FIG. 7, FIG. 7 is a schematic structure diagram of an embodiment of a computer device according to the present disclosure. The computer device 700 includes a memory 710 and a processor 720. The memory 710 of the computer device is configured to store a computer program. The processor 720 of the computer device is configured to implement the steps of a timing index anomaly detection method when executing the computer program.

In an embodiment of the present disclosure, the memory 710 stores the computer program for implementing the method of any one of the above embodiments. The processor 720 is configured to execute the computer program stored in the memory 710 to implement the steps of the above method embodiments. The processor 720 may also be referred to as a Central Processing Unit (CPU). The processor 720 may be an integrated circuit chip with signal processing capabilities. The processor 720 may also be a general purpose processor, a Digital Signal Processor (DSP), an Application Specific Integrated Circuit (ASIC), a Field Programmable Gate Array (FPGA) or other programmable logic devices, a discrete gate or transistor logic device, and a discrete hardware component. The general purpose processor may be a microprocessor, or the processor may also be any conventional processor, etc.

Figure 8:
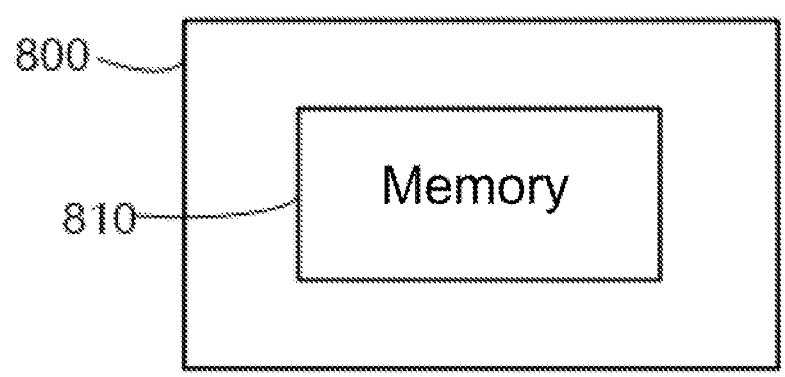
FIG. 8 is a schematic structure diagram of an embodiment of an apparatus having a storage function according to the present disclosure.

Referring to FIG. 8, FIG. 8 is a schematic structure diagram of an embodiment of an apparatus having a storage function according to the present disclosure. The apparatus 800 stores a program 810. The program 810, when executed, is capable of implementing timing index anomaly detection.

The apparatus 800 in the embodiment of the present disclosure stores a program 810. The program 810, when executed, is capable of implementing timing index anomaly detection. The computer program 810 may form a program file and be stored in the apparatus 800 in the form of a software product for causing a computer device (which may be a personal computer, a server, or a network device, etc.) or processor to perform all or part of the steps of the methods of various implementation modes of the present disclosure. The foregoing device 800 includes: a U disk, a mobile hard disk, a Read-Only Memory (ROM), a Random Access Memory (RAM), a magnetic disk, or an optical disk, and other media which may store a program code, or a computer, a server, a mobile phone, a tablet, and other terminal devices.

The above description is only the embodiment of the present disclosure, and thus does not limit the patent scope of the present disclosure. The equivalent structure or equivalent process transformations made by the present specification and the contents of the drawings, or directly or indirectly applied to other related technical fields, are all included in the scope of patent protection of the present disclosure.

What is claimed is:

1. A timing index anomaly detection method, comprising:

acquiring a plurality of pieces of timing index information about a service to be detected;

filtering, by a filtering layer, the plurality of pieces of timing index information according to a preset filtering condition, and retaining timing index information satisfying the preset filtering condition, the preset filtering condition corresponding to an anomaly detection condition, wherein the filtering layer is stateless and is able to be expanded horizontally according to an amount of data of the service to be detected;

adding a tag to the timing index information satisfying the preset filtering condition to form first timing index information, the tag being used for identifying the anomaly detection condition;

forwarding the first timing index information to a preset working node corresponding to the tag;

performing, by a working layer, anomaly detection on the first timing index information on the preset working node, wherein the working layer is able to be expanded horizontally; and determining whether an anomaly prompt is output.

2. The timing index anomaly detection method according to claim 1, wherein performing, by a working layer, anomaly detection on the first timing index information on the preset working node comprises:

aggregating, according to a preset aggregating condition within a preset period, the first timing index information on the preset working node to form second timing index information; and performing anomaly detection on the second timing index information.

3. The timing index anomaly detection method according to claim 2, wherein performing anomaly detection on the second timing index information to determine whether the anomaly prompt is output comprises:

performing anomaly detection on the second timing index information;

adding a detection result to the second timing index information to form third timing index information and storing the third timing index information;

judging whether the third timing index information complies with an anomaly condition; and when a judging result is that the third timing index information complies with the anomaly condition, outputting an anomaly prompt.

4. The timing index anomaly detection method according to claim 3, wherein outputting the anomaly detection prompt comprises:

outputting the anomaly prompt and anomaly result information.

5. The timing index anomaly detection method according to claim 1, wherein there are at least two anomaly detection conditions, and forwarding the first timing index information to the preset working node corresponding to the tag, performing anomaly detection on the first timing index information on the preset working node and determining whether the anomaly prompt is output comprises:

forwarding the first timing index information to at least two preset working nodes corresponding to tags one by one;

aggregating, according to a preset aggregating condition within a preset period, the first timing index information on the preset working node to form second timing index information;

performing anomaly detection on the second timing index information on each of the preset working nodes; and determining whether each working node outputs an anomaly prompt.

6. The timing index anomaly detection method according to claim 1, wherein there are at least two anomaly detection conditions; and forwarding the first timing index information to the preset working node corresponding to the tag and performing anomaly detection on the first timing index information on the preset working node comprises:

forwarding the first timing index information containing different tags to the preset working node;

filtering the first timing index information on the preset working node according to the tags; and performing anomaly detection on the filtered first timing index information on the preset working node.

7. The timing index anomaly detection method according to claim 1, wherein performing anomaly detection on the first timing index information on the preset working node comprises:

performing anomaly detection on the first timing index information on the preset working node according to a preset strategy that is selected according to the anomaly detection condition.

8. The timing index anomaly detection method according to claim 7, wherein the preset strategy comprises any one or a combination of a threshold trigger strategy, a jitter trigger strategy, a year-on-year trigger strategy, or a month-on-month trigger strategy.

9. A computer device, comprising:

a memory, configured to store a computer program; and a processor, configured to implement, when executing the computer program, the following actions:

acquiring a plurality of pieces of timing index information about a service to be detected;

filtering, by a filtering layer, the plurality of pieces of timing index information according to a preset filtering condition, and retaining timing index information satisfying the preset filtering condition, the preset filtering condition corresponding to an anomaly detection condition, wherein the filtering layer is stateless and is able to be expanded horizontally according to an amount of data of the service to be detected;

adding a tag to the timing index information satisfying the preset filtering condition to form first timing index information, the tag being used for identifying the anomaly detection condition;

forwarding the first timing index information to a preset working node corresponding to the tag;

performing, by a working layer, anomaly detection on the first timing index information on the preset working node, wherein the working layer is able to be expanded horizontally; and determining whether an anomaly prompt is output.

10. The computer device according to claim 9, wherein performing, by a working layer, anomaly detection on the first timing index information on the preset working node comprises:

aggregating, according to a preset aggregating condition within a preset period, the first timing index information on the preset working node to form second timing index information; and performing anomaly detection on the second timing index information.

11. The computer device according to claim 10, wherein performing anomaly detection on the second timing index information to determine whether the anomaly prompt is output comprises:

performing anomaly detection on the second timing index information;

adding a detection result to the second timing index information to form third timing index information and storing the third timing index information;

judging whether the third timing index information complies with an anomaly condition; and when a judging result is that the third timing index information complies with the anomaly condition, outputting an anomaly prompt.

12. The computer device according to claim 9, wherein there are at least two anomaly detection conditions, and forwarding the first timing index information to the preset working node corresponding to the tag, performing anomaly detection on the first timing index information on the preset working node and determining whether the anomaly prompt is output comprises:

forwarding the first timing index information to at least two preset working nodes corresponding to tags one by one;

aggregating, according to a preset aggregating condition within a preset period, the first timing index information on the preset working node to form second timing index information;

performing anomaly detection on the second timing index information on each of the preset working nodes; and determining whether each working node outputs an anomaly prompt.

13. The computer device according to claim 9, wherein there are at least two anomaly detection conditions; and forwarding the first timing index information to the preset working node corresponding to the tag and performing anomaly detection on the first timing index information on the preset working node comprises:

forwarding the first timing index information containing different tags to the preset working node;

filtering the first timing index information on the preset working node according to the tags; and performing anomaly detection on the filtered first timing index information on the preset working node.

14. The computer device according to claim 9, wherein performing anomaly detection on the first timing index information on the preset working node comprises:

performing anomaly detection on the first timing index information on the preset working node according to a preset strategy that is selected according to the anomaly detection condition.

15. A non-transitory media, the non-transitory media storing a program which, when executed, is capable of implementing the following actions:

acquiring a plurality of pieces of timing index information about a service to be detected;

filtering, by a filtering layer, the plurality of pieces of timing index information according to a preset filtering condition, and retaining timing index information satisfying the preset filtering condition, the preset filtering condition corresponding to an anomaly detection condition, wherein the filtering layer is stateless and is able to be expanded horizontally according to an amount of data of the service to be detected;

adding a tag to the timing index information satisfying the preset filtering condition to form first timing index information, the tag being used for identifying the anomaly detection condition;

forwarding the first timing index information to a preset working node corresponding to the tag;

performing, by a working layer, anomaly detection on the first timing index information on the preset working node, wherein the working layer is able to be expanded horizontally, and the filtering layer and the working layer are stripped; and determining whether an anomaly prompt is output.

16. The non-transitory media according to claim 15, wherein performing anomaly detection on the first timing index information on the preset working node comprises:

aggregating, according to a preset aggregating condition within a preset period, the first timing index information on the preset working node to form second timing index information; and performing anomaly detection on the second timing index information.

17. The non-transitory media according to claim 16, wherein performing anomaly detection on the second timing index information to determine whether the anomaly prompt is output comprises:

performing anomaly detection on the second timing index information;

adding a detection result to the second timing index information to form third timing index information and storing the third timing index information;

judging whether the third timing index information complies with an anomaly condition; and when a judging result is that the third timing index information complies with the anomaly condition, outputting an anomaly prompt.

18. The non-transitory media according to claim 15, wherein there are at least two anomaly detection conditions, and forwarding the first timing index information to the preset working node corresponding to the tag, performing anomaly detection on the first timing index information on the preset working node and determining whether the anomaly prompt is output comprises:

forwarding the first timing index information to at least two preset working nodes corresponding to tags one by one;

aggregating, according to a preset aggregating condition within a preset period, the first timing index information on the preset working node to form second timing index information;

performing anomaly detection on the second timing index information on each of the preset working nodes; and determining whether each working node outputs an anomaly prompt.

19. The non-transitory media according to claim 15, wherein there are at least two anomaly detection conditions; and forwarding the first timing index information to the preset working node corresponding to the tag and performing anomaly detection on the first timing index information on the preset working node comprises:

forwarding the first timing index information containing different tags to the preset working node;

filtering the first timing index information on the preset working node according to the tags; and performing anomaly detection on the filtered first timing index information on the preset working node.

20. The non-transitory media according to claim 15, wherein performing anomaly detection on the first timing index information on the preset working node comprises:

performing anomaly detection on the first timing index information on the preset working node according to a preset strategy that is selected according to the anomaly detection condition.

* * * * *